(12) United States Patent
Mueller et al.

(10) Patent No.: US 12,373,546 B1
(45) Date of Patent: Jul. 29, 2025

(54) AUTOMATED CLOUD-BASED NETWORK FUNCTION INTEROPERABILITY TESTING

(71) Applicant: Amazon Technologies, Inc., Seattle, WA (US)

(72) Inventors: Julius Mueller, Santa Cruz, CA (US); Dimitrios Elissaios, Seattle, WA (US); Sanket Modak, Bellevue, WA (US); Nikolay Krasilnikov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 346 days.

(21) Appl. No.: 17/810,319

(22) Filed: Jun. 30, 2022

(51) Int. Cl.
  *G06F 21/53* (2013.01)

(52) U.S. Cl.
  CPC ........ *G06F 21/53* (2013.01); *G06F 2221/033* (2013.01)

(58) Field of Classification Search
  CPC ...................................... G06F 21/53
  USPC ............................................................ 726/22
  See application file for complete search history.

(56) References Cited

U.S. PATENT DOCUMENTS

| | | | |
|---|---|---|---|
| 8,539,079 | B2 | 9/2013 | Thireault |
| 9,125,047 | B2 | 9/2015 | Sundaresan et al. |
| 9,703,660 | B2 | 7/2017 | Cillis et al. |
| 9,838,268 | B1 | 12/2017 | Mattson |
| 9,876,851 | B2 | 1/2018 | Chandramouli et al. |
| 10,064,242 | B2 | 8/2018 | Pawar et al. |
| 10,135,702 | B2 * | 11/2018 | Lahiri ................... H04L 43/028 |
| 10,244,507 | B2 | 3/2019 | Tarlazzi et al. |
| 10,257,105 | B2 | 4/2019 | Majmundar et al. |
| 10,419,550 | B2 | 9/2019 | Nainar et al. |
| 10,581,717 | B2 | 3/2020 | Tejaprakash et al. |
| 10,594,456 | B2 * | 3/2020 | Park .................... H04W 72/046 |
| 10,608,734 | B2 | 3/2020 | Barbieri et al. |
| 10,705,808 | B2 | 7/2020 | Chiosi et al. |
| 10,749,721 | B2 | 8/2020 | Fertonani et al. |
| 10,750,514 | B2 | 8/2020 | Fujinami |
| 10,817,409 | B2 | 10/2020 | Zeng et al. |
| 10,880,173 | B2 * | 12/2020 | Seenappa ............ H04L 41/5058 |
| 10,944,668 | B2 | 3/2021 | Rajagopal |
| 10,959,098 | B2 | 3/2021 | Cidon et al. |
| 10,999,783 | B2 | 5/2021 | Pateromichelakis |
| 11,190,413 | B1 | 11/2021 | Priya et al. |
| 11,356,500 | B1 | 6/2022 | Gupta et al. |
| 11,539,582 | B1 | 12/2022 | Gupta et al. |

(Continued)

OTHER PUBLICATIONS

U.S. Appl. No. 18/146,126, filed Dec. 23, 2022, Diwakar Gupta.

(Continued)

*Primary Examiner* — Linglan Edwards
*Assistant Examiner* — Phuc Pham
(74) *Attorney, Agent, or Firm* — Robert C. Kowert; Kowert, Hood, Munyon, Rankin & Goetzel, P.C.

(57) ABSTRACT

A testing manager at a provider network configures a multi-network-function test sandbox for a first network function developed by a first vendor. To configure the sandbox, the testing manager causes the first network function to be run at a first server and verifies network connectivity between the first network function and another network function which is not developed by the first vendor. The testing manager causes a test to be run, which includes transmission of messages from the first network function to the second network function. A result of the test is provided via a programmatic interface.

20 Claims, 10 Drawing Sheets

(56) References Cited

U.S. PATENT DOCUMENTS

| | | |
|---|---|---|
| 11,552,842 B2 | 1/2023 | Barabell |
| 2012/0127151 A1 | 5/2012 | Murakami |
| 2018/0146375 A1 | 5/2018 | Pawar et al. |
| 2018/0365635 A1 | 12/2018 | Lucrecio et al. |
| 2019/0042326 A1 | 2/2019 | Chilikin |
| 2019/0158606 A1 | 5/2019 | Guim Bernat et al. |
| 2019/0165906 A1 | 5/2019 | Bala et al. |
| 2019/0190785 A1 | 6/2019 | Power |
| 2019/0213029 A1 | 7/2019 | Liu et al. |
| 2019/0289497 A1 | 9/2019 | Rajagopal |
| 2019/0391855 A1 | 12/2019 | Bernat et al. |
| 2019/0394826 A1 | 12/2019 | Wang et al. |
| 2020/0245229 A1 | 7/2020 | Horn et al. |
| 2021/0006944 A1 | 1/2021 | Raghothaman et al. |
| 2021/0073047 A1 | 3/2021 | Bhandaru |
| 2021/0144517 A1 | 5/2021 | Guim Bernat et al. |
| 2021/0144555 A1 | 5/2021 | Kim et al. |
| 2021/0243770 A1 | 8/2021 | Roessler |
| 2021/0271517 A1 | 9/2021 | Guim Bernat |
| 2022/0030117 A1 | 1/2022 | Young et al. |
| 2022/0046084 A1 | 2/2022 | Nair |
| 2022/0070734 A1 | 3/2022 | Rajagopal |
| 2022/0188403 A1* | 6/2022 | Montasser .......... G06F 9/45558 |
| 2022/0377615 A1 | 11/2022 | Radunovic |

OTHER PUBLICATIONS

U.S. Appl. No. 18/067,651, filed Dec. 16, 2022, Frank Paterra.
U.S. Appl. No. 18/067,650, filed Dec. 16, 2022, Jiandong Huang.
U.S. Appl. No. 18/066,943, filed Dec. 15, 2022, Awaiz Ahmad Khan.
U.S. Appl. No. 18/067,654, filed Dec. 16, 2022, Frank Paterra.
Ashfaq Ahmed, et al., "Hybrid Automatic Repeat Request (HARQ) in Wireless Communication Systems and Standards: A Contemporary Survey", IEEE Communications Surveys & Tutorials 23.4, 2021, pp. 2711-2752.
Unknown, "5G; NG-RAN; Architecture Description", Technical Specification, ETSI TS 138 401, Version 16.8.0, Release 16, Jan. 2022, pp. 1-82.
U.S. Appl. No. 17/710,571, filed Mar. 31, 2022, Manjari Asawa.
U.S. Appl. No. 17/548,391, filed Dec. 10, 2021, Ammar Latif.
U.S. Appl. No. 17/364,791, filed Jun. 30, 2021, Diwakar Gupta.
U.S. Appl. No. 17/364,779, filed Jun. 30, 2021, Diwakar Gupta.
U.S. Appl. No. 17/364,788, filed Jun. 30, 2021, Diwakar Gupta.
U.S. Appl. No. 17/806,684, filed Jun. 13, 2022, Benjamin Wojtowicz.
U.S. Appl. No. 17/806,685, filed Jun. 13, 2022, Benjamin Wojtowicz.
U.S. Appl. No. 17/461,785, filed Aug. 30, 2021, Diwakar Gupta.
U.S. Appl. No. 17/809,864, filed Jun. 29, 2022, Nikolay Kirschenmann, et al.
U.S. Appl. No. 17/820,542, filed Aug. 17, 2022, Nikolay Kirschenmann, et al.
U.S. Appl. No. 17/807,343, filed Jun. 16, 2022, Upendra Bhalchandra Shevade et al.
U.S. Appl. No. 17/807,344, filed Jun. 16, 2022, Upendra Bhalchandra Shevade et al.
U.S. Appl. No. 17/807,341, filed Jun. 16, 2022, Upendra Bhalchandra Shevade et al.
U.S. Appl. No. 17/808,518, filed Jun. 23, 2022, Ozgur Dural.
U.S. Appl. No. 17/326,218, filed May 21, 2021, Ximeng Simon Yang.
U.S. Appl. No. 17/326,221, filed May 20, 2021, Ximeng Simon Yang.

* cited by examiner

AUTOMATED CLOUD-BASED NETWORK FUNCTION INTEROPERABILITY TESTING

BACKGROUND

Several generations of broadband cellular communication technologies have been deployed in recent years. 5G is the fifth-generation technology standard for broadband cellular networks, which is gradually taking the place of the fourth-generation (4G) standard of Long-Term Evolution (LTE). 5G technology offers greatly increased bandwidth, thereby broadening the cellular market beyond smartphones to provide last-mile connectivity to desktops, set-top boxes, laptops, Internet of Things (IoT) devices, and so on. Some 5G cells employ frequency spectrum similar to that of 4G, while other 5G cells may employ frequency spectrum in the millimeter wave band. Cells in the millimeter wave band may have a relatively small coverage area but may offer much higher throughput than 4G. As 5G technology becomes more prevalent, new types of broadband-based applications are likely to be developed and deployed, in some cases combining application components produced by different vendors.

Figure 1:
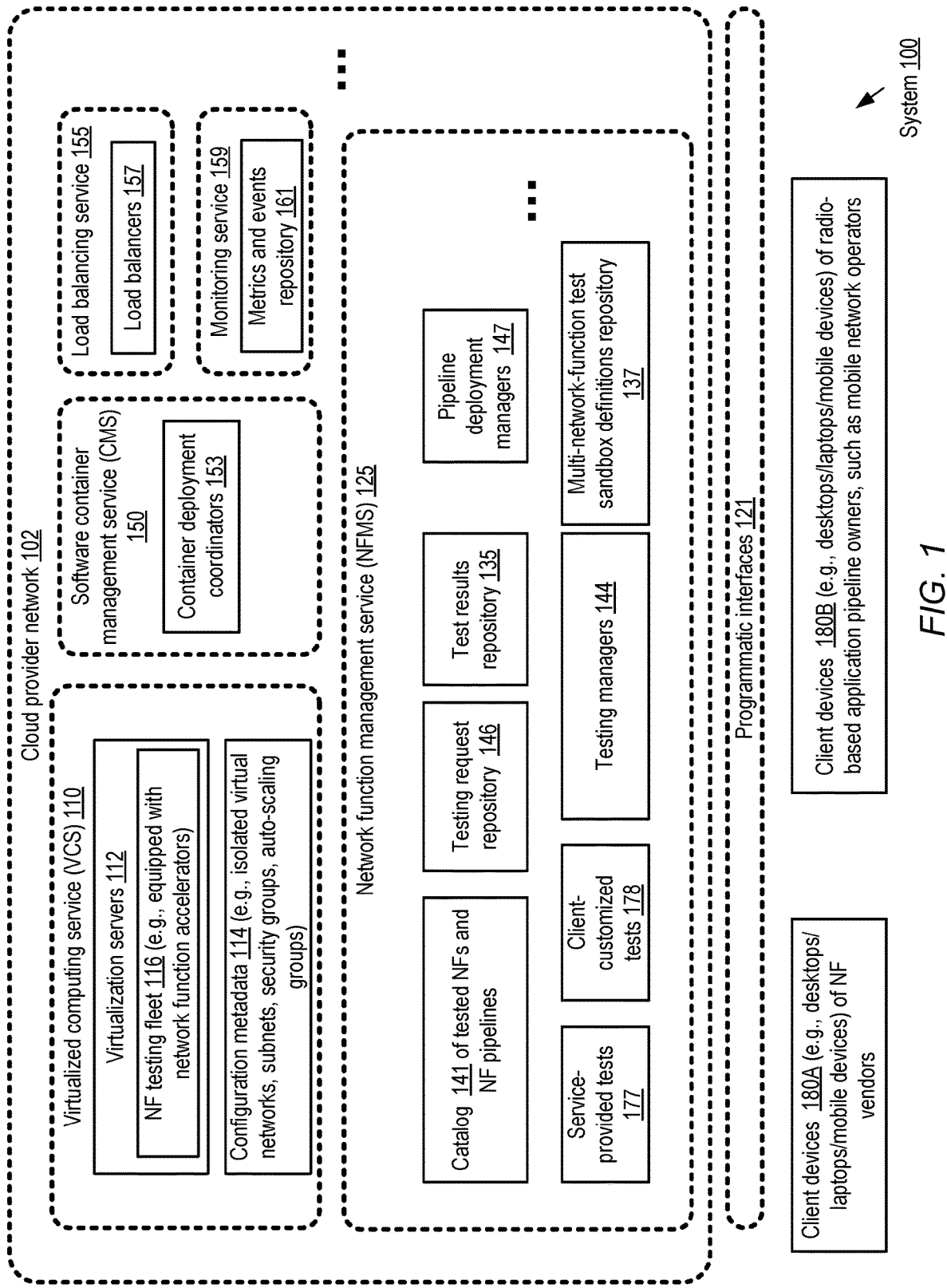
FIG. 1 illustrates an example system environment in which a cloud-based service provides automated testing of interoperability of radio-based application network functions from different vendors, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the term "set" should generally be interpreted to include one or more described items throughout this application. Accordingly, phrases such as "a set of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for automating various aspects of testing of network functions of radio-based applications at a cloud provider network service, including the testing of interoperability of network functions developed by several different vendors independently. The term "radio-based application" (RBA) is used herein to refer to applications in which at least some messages are transmitted using radio frequency signals and associated antennas, such as those used for various generations (4G, 5G and the like) of cellular broadband technologies. A network function is a functional building block within a network infrastructure, which has well-defined external interfaces and a well-defined functional behavior. Network functions can be chained together in pipelines to form RBAs. Network functions have historically been implemented as a physical network appliance or node; however network functions can be virtualized as well. A given RBA implemented at least partly using resources of a cloud provider network, for example, can include network functions at the core network layer, as well as network functions of centralized units (CUs), distributed units (DUs) and radio units (RUs) of radio-access network (RAN) nodes.

Respective sets of network functions can be designed and developed by different vendors, such as independent software vendors (ISVs). For thorough testing of a given network function, and especially for testing of network functions expected to be deployed at least partly at a cloud provider network by an RBA pipeline owner such as a mobile network operator, a fairly sophisticated test environment or sandbox typically has to be utilized. Setting up such an environment can impose at least two types of burdens on the network function vendor or the RBA pipeline owner. Firstly, the RBA pipelines to be tested can include network functions from other vendors upstream or downstream in the pipelines, and the vendor whose network function is to be tested may not necessarily be an expert in the configuration and use of such other network functions. Also, the other vendors may not want their own network functions launched using a cloud provider network client account of the tested network function, may not want to provide to provide the vendor of the tested network function with binaries of their network functions, and so on. To alleviate such concerns, a network function management service can provide or support application programming interfaces which can be used by network functions of different vendors to communicate, while using separate client accounts for the different vendors' network functions. Secondly, setting up a test environment can require various cloud computing configuration operations, such as setting up isolated virtual networks (IVNs, also known as virtual private clouds or VPCs), security groups, subnets, compute instances and the like, and then enabling network connectivity and routing between the configured resources. For example, to ensure isolation of one vendor's network functions from another vendor's network functions during a test, respective sets of network functions from distinct vendors can be run within respective IVNs in some embodiments. Such cloud resource configuration operations can represent a non-trivial effort depending on the complexity of the pipeline. To an RBA pipeline owner, the ability of a given network function from a given network function vendor to interoperate and perform well with network functions provided by other vendors can be of great interest. In some cases, the particular combinations of network functions (which can be produced collectively by various vendors) that are chained together for an RBA deployment can be selected based at least partly on the results of tests conducted using such test environments.

A provider network can include a network function management service that automates and simplifies the process of running such tests. The service can maintain a catalog of network functions that have already been successfully tested using at least a baseline set of tests approved by the provider network operator, and can thus be used together in a pipeline with a new network function for which a testing request is received. The service can configure one or more multi-network-function test sandboxes, e.g., using a test resource fleet of the provider network, and then run one or more test suites on a pipeline that includes the new network function. Configuration of the sandbox can include, among other tasks, establishing one or more IVNs, launching one or more compute instances (using virtualization severs of a virtualized computing service) at which network functions of the pipeline are to be run, verifying connectivity between network functions run at the compute instances, executing one or more suites of tests which include the exchange of messages between the new network function and other pre-tested network functions of the pipeline, monitoring/logging the test results, and so on. IVNs may be used to isolate various layers of an RBA in various embodiments, e.g., in compliance with recommendations published by the provider network operator for RBA deployment architectures and/or to separate the sets of resources used for network functions of different vendors; various other configuration steps for the sandbox may be needed, for example, to enhance RBA scalability and security while minimizing or reducing resource consumption and thereby reducing costs. The requester of the testing does not have to perform the detailed configuration tasks needed for setting up the sandbox, and does not have to conduct the tests. Results of the tests can be provided via programmatic interfaces of the service. A wide variety of tests can be conducted automatically, including interoperability tests (indicating whether the new network function can communicate as expected by various radio-based technology standards with network functions from other vendors, for example), performance tests, resilience or reliability/durability tests, security tests, and the like. Note that while many of the examples in this document apply primarily to 5G, the techniques described herein may be used for testing network functions of any generation of radio-based application technology, including 4G/LTE, 5G and post-5G generations or variants.

After at least some test results pertaining to a new network function satisfy acceptability criteria of the service, that network function can be included in the catalog of tested network functions, and can be combined with other tested functions for production deployment of RBAs if desired by RBA owners. If a given network function's test results are unsatisfactory, the test results can be used by the vendor of the network function to correct the deficiencies in the network function's implementation, and the vendor can re-submit the corrected version of desired. Network function testing requests can be submitted via programmatic interfaces of the service, e.g., by the vendors who create the to-be-tested network functions or by RBA owners who wish to evaluate a new network function from a particular vendor, or who wish to evaluate a set of network functions in a newly-designed pipeline. Several levels of automated testing can be supported by the service—e.g., including an initial level of functional and interoperability testing (requested for example by the vendor that produces a network function), and subsequent more complex tests (requested for example by RBA owners) in which different combinations or variations of network functions are stress tested if desired with varying sizes/performance capacities of pipeline nodes.

As one skilled in the art will appreciate in light of this disclosure, certain embodiments may be capable of achieving various advantages, including some or all of the following: (a) enabling accelerated testing and deployment of individual network functions, (b) improving, by using a common testing framework and tool set which is used repeatedly over a long period of time at a cloud provider network, the reliability of testing results obtained for network functions, (c) enabling various combinations of network functions from different vendors to be tested in parallel at cloud-based deployment environments, and/or (d) improving the user experience of end users of radio-based applications by pre-verifying the quality of the initial deployments of such applications.

According to some embodiments, a system may include a testing manager of a network function management service (NFMS) of a cloud provider network, and a test resource fleet comprising a plurality of servers. The test resource fleet may, for example, comprise a set of virtualization servers of a virtualized computing service (VCS) of the provider network. The testing manager may be configured to receive a testing request, via a programmatic interface, indicating a particular network function (e.g., a virtualized network function) of a radio-based application (RBA) which is to be tested. The network function to be tested may be referred to as a test target network function (TTNF), and may have been developed by a particular software vendor. In various embodiments, in response to the testing request, the testing manager may configure or establish a multi-network-function test sandbox for the TTNF. Configuration/establishment of the sandbox may include numerous tasks in different embodiments, such as establishing an isolated virtual network (IVN) of a virtualized computing service (VCS) of the cloud provider network, and launching a compute instance within the IVN using a particular server from the test resource fleet. For example, in one scenario, a network function NF1 from one vendor V1 may be run within an IVN IVN1 during a test, while another network function NF2 may be run within a separate IVN IVN2 during the test, so it may be the case that multiple IVNs are set up for a sandbox. In some cases, depending on the specific types of tests to be conducted, the server may be selected for use in the test based at least in part because it is equipped with a hardware network function accelerator. The testing manager may cause the TTNF to be run using the compute instance, e.g., either as a process or thread running at the compute instance or using a portion of a hardware network function accelerator accessible from the compute instance.

The testing manager may verify network connectivity between the TTNF and one or more other network functions also run within the sandbox in various embodiments. The TTNF and the other network functions may form a pipeline of an RBA in various embodiments. In at least some embodiments, some or all of the other network functions may have been developed by vendors other than the vendor of the TTNF, or by the operator of the cloud provider network. The testing manager may cause a test to be run, which includes the exchange of messages between the TTNF and one or more of the other network functions. Results of the test may be provided by the testing manager via a programmatic interface in various embodiments. Any of a variety of tests may be run to exercise the TTNF in different embodiments. The client that submits the testing request may specify custom tests, or allow the testing manager to run default NFMS-provided tests for the class of network functions to which the TTNF belongs.

In various embodiments, network functions tested using the techniques described herein may be part of any of a variety of radio-based technology stacks, including for example the 5G-NR (Fifth Generation-New Radio) technology stack. The 5G-NR stack comprises three layers, referred to as L1 (layer 1), L2 (layer 2) and L3 (layer 3). Standardized interfaces for communications between the layers (and between sub-layers of individual layers) have been defined; this allows network functions of the layers and sub-layers to be mapped flexibly to different hardware and/or software components as long as the interfaces and performance requirements of the protocol stack can be met. Logic for executing the functionality of the layers is distributed among three types of components: centralized units (CUs) for L3 operations, distributed units (DUs) used for L2 operations and optionally for some L1 operations, and radio units (RUs) used for at least a subset of L1 operations. L1 is also referred to as the physical layer (PHY). L2 comprises the MAC (Medium Access Control) and RLC (Radio Link Control) sub-layers. L3 may include sub-layers for PDCP (Packet Data Convergence Protocol) and SDAP (Service Data Adaptation Protocol). L3 network functions can communicate with another layer of the radio-based application technology stack, referred to as the core network layer. In 5G radio-based applications, a radio access network (RAN) node may include one or more CUs, one or more DUs and one or more RUs.

An NFMS of the kind described herein may enable the testing of network functions from different vendors at different layers of the radio-based technology stack. For example, in one embodiment, a cloud provider network may support a server design that includes a hardware accelerator for L1 network functions from a particular vendor V1, with V1 providing both the accelerator hardware as well as associated firmware/software (e.g., firmware/software comprising L1 network function logic) that runs on the accelerator. As such, V1 may represent an example of a software vendor as well as an accelerator hardware vendor. In such a scenario, vendors of L2 and/or L3 network functions may be able to utilize the NEMS to test their network functions along with vendors V1's L1 network functions. To run such tests, the NFMS may utilize servers equipped with V1's accelerators as part of the multi-network-function test sandboxes used for the tests. In at least some embodiments, one vendor's RAN node network functions (e.g., network functions at L1, L2 and/or L3 layers of the stack) may be tested together with core network functions developed by another vendor. In general, network functions from any combination of vendors, and at any combination of layers of a radio-based technology stack, may be tested using sandboxes set up by an NFMS.

In some embodiments, the network function management service may provide an indication, via a programmatic interface, that a particular network function (which may have already passed a first or baseline set of tests conducted by the service) is available for testing of radio-based application pipelines. Such an indication may be provided, for example, to an entity other than the vendor or source of the network function, such as a mobile network operator or an RBA pipeline owner. The other entity may then, if desired, submit testing requests for more complex tests of the particular network function in which, for example, numerous alternative combinations of network functions may be tested under varying workloads and the like. Multi-network-function sandboxes for testing the alternative combinations may be set up by the service in various embodiments; in at least one embodiment, tests may be conducted at least partly in parallel on several different sandboxes configured for the alternative combinations.

Configuration of the sandboxes used for testing the network functions by a testing manager may comprise several other types of operations in some embodiments. Such operations may include, among others, establishing a load balancer for network traffic transmitted between a pair of layers of a multi-layer network function pipeline. Executing a test may comprise causing network traffic to be transmitted between the pair of layers with the TTNF being executed at a particular layer of the multi-layer network function pipeline in various embodiments. As part of sandbox configuration, in some embodiments an auto-scaling group may be established for resources at a particular layer of a multi-layer network function pipeline which includes the TTNF at one of the layers. An auto-scaling group may define rules (formulated for example by the testing manager) to be used to automatically add or remove sandbox resources, e.g., based on changes in measured workloads, resource utilization levels, and the like.

According to some embodiments, a testing request may include a performance testing specification. The workload level experienced by the TTNF in the testing may be varied, e.g., using a workload generator, by the testing manager in accordance with the performance testing specification. In one embodiment, a testing request may indicate a workload generator service or tool (e.g., a $3^{rd}$-party tool or service, implemented by an entity other than the provider network operator and other than the testing request submitter) selected by the testing request submitter, to be used for providing the workload for the testing. In other embodiments the testing manager may choose such a tool/service without receiving input from the testing requester identifying the tool/service.

In one embodiment, a testing request may include a resilience testing specification. According to such a specification, the response or behavior of the TTNF in the event of a failure or error may be checked by the testing manager. The testing manager may for example utilize an error injection tool or service for the resilience testing, and/or cause failures at one or more components of the sandbox and monitor the response of the TTNF.

In various embodiments, at least some network functions utilized in a test (e.g., including the TTNF itself, or other network functions) may be executed at a network function accelerator rather than at the primary processors (CPUs) of a server of the test fleet. The provider network may include a set of virtualization servers equipped with offloading cards that include network function accelerators, and the tests of the TTNF may utilize such servers in such embodiments.

In at least one embodiment, a testing request submitted to the network function management service may include an indication of a network function interconnection topology to be used for a test of a TTNF. The interconnection topology may for example indicate a mapping between servers and network functions of a pipeline, and the testing manager may select and configure different servers based on such a topology. The total number of servers to be included in the sandbox may be determined or deduced using the interconnection topology, as well as the placement of network functions at various servers. The interconnection topology may represent the testing context or environment at a logical level, while the testing manager may be responsible for the concrete steps needed to acquire and configure the resources needed for the test. In some embodiments, as mentioned above, a test run at the NFMS in response to a testing request may include executing at least one network function at a hardware network function accelerator of one of the servers used in the test. A TTNF may in some cases comprise firmware or software that is executed at the hardware network function accelerator in such embodiments. The TTNF may implement various portions of an RBA in different embodiments, such as a portion of one of: (a) a distributed unit (DU) of a radio access network (RAN) node, (b) a centralized unit (CU) of a RAN node, or (c) a core network of a radio-based application.

In various embodiments, multi-network-function test sandboxes of the kind described above can be used to test a variety of radio-based or telecommunication applications (e.g., various types of broadband cellular applications such as private 5G (fifth generation) networks, IoT (Internet of Things)-based applications, public 5G applications and the like. The core and RAN (radio access network) network functions referenced herein can be based at least partly on the $3^{rd}$ Generation Partnership Project (3GPP) specifications, European Telecommunications Standards Institute (ETSI) specifications, and/or other wireless communications standards in some implementations. RAN network functions are used in a radio network, typically running in cell towers and performing wireless signal to IP (Internet Protocol) conversion. Core network functions typically run in large data centers performing subscriber related business logic and routing IP traffic to the internet and back. According to the present disclosure, after they have been tested using the automated techniques described, both core and RAN network functions can be run on a virtualization server of a cloud provider, for example an edge device provisioned to a customer to implement a private 5G network, or used by a wireless service provider or the cloud provider to create a public 5G network. Note that the techniques described herein are not limited to any particular generation of cellular broadband, nor are they limited to applications that utilize any particular portion of the electromagnetic spectrum for message transmissions.

As mentioned above, network functions of various radio-based application may be tested and/or executed at least in part using resources of a provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network or as a VCS extension resource group. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

As mentioned above, some cloud provider networks may provide support for local zones, a type of infrastructure deployment that places some of the provider network's compute, storage, database, and other select services close to large population, industry, and IT centers or other desired locations which may not be very near the provider network's primary data centers. With such local zones, applications that need single-digit millisecond latency can be run closer to end-users in a specific geography. Local zones provide a high-bandwidth, secure connection between local workloads and those running in a provider network region, allowing provider network clients to seamlessly connect to their other workloads running in the region and to the full range of in-region services through the same APIs and tool sets.

The cloud provider network may implement various computing resources or services, which may include a network function management service, a virtual computing service (VCS), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). In some embodiments, a testing manager of a network function management service may set up sandboxes that include resources at edge locations such as outposts, local zones and the like for testing network functions. The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, a virtualized computing service (VCS) or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores, NFAs or other accelerators), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. Various types of compute instances, some of which may have access to hardware network function accelerators (e.g., incorporated within cards connected via Peripheral Component Interconnect-Express (PCIe) links to the primary processors of virtualization servers at which the compute instances are run) may be used to run automated network function tests in different embodiments. Using network function accelerators for executing some network functions of an RBA may be helpful in at least two ways in various embodiments: firstly, the network functions may run faster on optimized hardware than on the primary processors (e.g., CPUs), and secondly, offloading network functions to the accelerators may free up compute capacity of the primary processors for other applications (which may include other network functions of the RBA).

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. RBA components, including DU and CU network functions, may be run using containers in at least some embodiments. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which a cloud-based service provides automated testing of interoperability of radio-based application network functions from different vendors, according to at least some embodiments. As shown, system 100 includes resources and artifacts of several network-accessible service of a cloud provider network 102, including a network function management service (NFMS) 125, a virtualized computing service (VCS) 110, a software container management service (CMS) 150, a load balancing service 155, and a monitoring service 159. The provider network 102 may also include a number of other services which are not shown in FIG. 1, such as an object storage service, a database service and the like, some of which may also be used for the NF tests (e.g., for storing the results of tests, or objects representing sandboxes).

In the embodiment shown in FIG. 1, the NFMS may include a set of testing managers 144. A given testing manager 144 may comprise some combination of hardware and software, and may in some implementations comprise one or more compute instances of the VCS. The testing managers may be responsible for responding to testing requests submitted via programmatic interfaces 121 from at least two types of NFMS clients. NFMS clients may include network function vendors, who may submit testing requests from client devices 180A such as desktops, laptops, mobile devices and the like, as well owners of radio-based application pipelines, who may submit testing requests from similar client devices 180B in the depicted embodiment. RBA pipeline owners may include, for example, mobile network operators or enterprise managers (e.g., an owner or manager of a large industrial site with numerous Internet-of-Things devices connected via a 5G network). Programmatic interfaces 121 may include, for example, web-based consoles, command-line tools, application programming interfaces (APIs), graphical user interfaces and the like in different embodiments.

The testing managers 144 may utilize resources at several other services of the provider network to perform the tests requested by the clients in some embodiments, including for example a NF testing fleet 116 which is part of a larger collection of virtualization servers 112 of the VCS 110. Depending on the specific network functions to be tested, some of the virtualization servers selected for testing network functions may include or be equipped with hardware network function accelerators (NFAs) in various embodiments. Any of a variety of tests may be run on a given NF or a set of NFs indicated in a testing request, such as service-provided tests 177 (a set of tests that has been prepared at the NFMS and utilized for various types of standards-compliant NFs) and/or client-customized tests 178 (tests whose steps are specified by the NFMS client). The service-provided tests may include a set of baseline tests that a given NF needs to pass before the NF can be included in the catalog 141 of tested NFs.

A particular testing manager 144 may be selected for coordinating the response to a given testing request, e.g., based on factors such as the workload levels of different testing managers at the time the testing request is received. In response to receiving the testing request from a NEMS client via a programmatic interface 121, a representation of the testing request may be stored in testing request repository 146 in various embodiments, and the testing manager may configure a multi-network-function test sandbox for one or more network functions indicated in the testing request. A testing target network function (TTNF) indicated in the testing request may have been developed by a particular software vendor; the set of other network functions which are used together with the TTNF in the test may include network functions developed by other vendors (or developed by the operator of the provider network 102) in at least some embodiments.

A number of configuration steps may be required for setting up the sandbox in different embodiments, such as setting up one or more isolated virtual networks (IVNs) within the VCS, subnets within the IVNs, launching compute instances within the IVN (some of which may be used to run or communicate with the network functions being tested together), setting up security rules (such as security groups) similar to firewall rules, setting up software container groups such as Kubernetes® clusters, and so on. An IVN may comprise a collection of networked resources (including, for example, compute instances) allocated to a given VCS client, which are logically isolated from (and by default, inaccessible from) resources allocated for other clients in other isolated virtual networks. In the case of IVNs used for VNF testing, the NFMS may be the client of the VCS on whose behalf IVNs are set up in some embodiments, while the IVNs may be set up on behalf of the submitter of the testing request in other embodiments. The client on whose behalf an IVN is established may be granted substantial flexibility regarding network configuration for the resources of the IVN—e.g., private IP addresses for application compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. In various embodiments, VCS configuration settings chosen by the testing manager and used for the multi-network function sandbox may be stored as part of configuration metadata 114 of the VCS. Descriptors of the sandboxes configured by various testing managers may be stored in multi-network-function test sandbox definitions repository 137 in the depicted embodiment. The stored descriptors may for example be provided to the NFMS clients on whose behalf the sandboxes were set up, e.g., in response to additional programmatic requests received via interfaces 121 in some embodiments. The sandbox descriptors may provide the clients insights into the kinds of VCS configuration steps that may have to be taken for production deployments of the tested network functions, for example.

In some embodiments, the network functions to be tested for a given client may be implemented within software containers stored and managed by CMS 150. A VNF vendor may for example provide an identifier of a CMS-managed container (within which the executable code of a VNF resides) in a testing request. A testing manager may submit a request to a container deployment coordinator 153 to deploy the container with the network function at a particular compute instance set up within an IVN established by the testing manager in such an embodiment. Similar containers may be deployed and run for additional network functions which are to be tested together in some embodiments. In some embodiments clusters of containers may be used at one or more layers of a tested NF pipeline.

After the network functions have been deployed at the compute instances, in at least some embodiments the testing manager may verify network connectivity between the different network functions that are to communicate with one another as part of the testing. For example, connectivity between a network function NF1 (developed by a software vendor V1, and run at a compute instance CI1 of the sandbox) and another network function NF2 (developed by a different software vendor V2, and run at a different compute instance CI2) may be tested by exchanging packets between testing agent programs run at the respective compute instances at which NF1 and NF2 are deployed, using respective network addresses within the IVN or IVNs in which the compute instances were launched. The compute instances' network addresses may have been selected by the testing manager from a range of IVN addresses also chosen by the testing manager in some embodiments.

The testing manager may orchestrate or cause the execution of one or more tests which include the exchange of messages between different network functions using the configured sandbox in the depicted embodiment. In some cases, workloads for the tests may be generated using VCS resources, e.g., comprising other compute instances which can emulate or simulate the behavior of one or more layers of a radio-based technology stack. For example, in a test for which the TTNF is a network function within a DU of a RAN node, and other network functions of the DU and/or CU are also run at selected compute instances of the sandbox, a workload generation tool that simulates the operations of a radio unit (RU) with which the DU communicates may be employed. In some embodiments, the NFMS client may include an indication of a specific workload generation tool (e.g., a tool or service provided by a third party other than the provider network operator and other than the NFMS client) to be used for a test, and the testing manager may utilized the specified tool. Messages produced by the workload generation tool may for example be submitted to the TTNF (or to other network functions) during the test in various embodiments. Results of the testing may be provided to the NFMS client (the submitter of the testing request) via programmatic interfaces 121 and also stored in test results repository 135. In at least some embodiments in which a NF vendor uses the NFMS to test several versions of the same NF or NFs, a report indicating the differences in the results as well as sandbox configurations (if any) between the tests of successive versions (or any specified) set of versions may be provided by the NFMS to the vendor.

In various embodiments, the NFMS may comprise one or more catalogs 141 of tested NFs and/or tested pipelines of NFs. After a given NF has been tested successfully for basic functionality and interoperability with at least some other NFs in response to one or more testing requests, the given NF may be included in a catalog of NFs that are available for further testing within more complex RBA pipelines, for example. An RBA pipeline owner may view the catalog contents, select various NFs to be linked in a new pipeline, and submit a testing request for the new pipeline in the depicted embodiment. In response to the testing request for the new pipeline, one or more sandboxes may be configured by a testing manager, and the desired types of tests may be executed by the testing manager.

In at least some embodiments, the RBA pipeline of network functions to be tested in response to a client request may include several layers, with multiple logically equivalent copies or replicas of network functions at some of the layers. In some such scenarios, load balancing may be required for the RBA traffic between some of the layers. In at least one embodiment in which the provider network comprises a load balancing service 155, a load balancer 157 implemented at that service may be set up at the request of the testing manager for such traffic. In one embodiment, one or more auto-scaling groups of compute instances or other resources may be set up by the testing manager (e.g., using an auto-scaling service implemented as part of the VCS) at one or more layers of the pipeline, enabling more resources to be added at such layers automatically as the workload increases during a performance or stress test, for example.

As part of running a test requested by a NFMS client, the testing manager may also coordinate the implementation of various other infrastructure components in some embodiments, including configuring tools for monitoring resource use (e.g., utilizations of the CPUs, network function accelerators, memory etc.), events of interest (e.g., failures, start/stop timings of various operations), and the like. A monitoring service 159 of the provider network may be used for such purposes in one embodiment. The monitoring service may provide APIs that can be invoked to capture measurements and event occurrences, and the testing manager may cause such APIs to be invoked from the resources being used for the test in some embodiments. The monitored data (including for example time series of resource utilizations, log records corresponding to events of interest, etc.) from the tests may be stored in a metrics and events repository 161 in the depicted embodiment. In response to programmatic requests from NFMS clients, such monitoring data may be provided in at least some embodiments.

Several different kinds of tests may be coordinated by a testing manager in some embodiments for a given set of network functions. For example, a testing request may include a performance testing specification, and the testing manager may cause the workload level of a TTNF to be varied in accordance with the specification. A performance testing specification may, for example indicate that inbound message rates from one kind of network function NF1 to another network function NF2 should be varied between X messages per second and Y messages per second, and the testing manager may set up and scale sandbox resources accordingly. In some embodiments, a testing request may include a resilience testing specification, indicating that the response of an NF to various types of failures or errors is to be determined. In accordance with such a resilience testing specification, the testing manager may cause such errors or failures to be introduced within the test sandbox and determine the response of the NF. In at least some embodiments, a testing request may indicate a logical interconnect topology or a mapping between servers and network functions (e.g., how many distinct servers are to be used, and which combination of one or more network functions can be run on a given server), and the testing manager may select and configure servers accordingly for the sandbox. In various embodiments, network functions of one or more RBA layers such as DUs, CUs and core network layers may be testing by the NFMS in response to client requests.

In the embodiment depicted in FIG. 1, after an RBA pipeline has been tested successfully (i.e., after satisfactory results have been obtained from the perspective of the RBA pipeline owner that requested the testing of the pipeline), a pipeline deployment manager 147 may be used to deploy a version of the pipeline for production use. For example, an RBA pipeline owner may send a pipeline deployment request to the NFMS, indicating a set of locations (such as edge locations, provider network data centers and the like) at which various subsets of the pipeline's NFs are to be executed, and the deployment manager may take the configuration steps necessary to launch the NFs at the desired locations.

Figure 2:
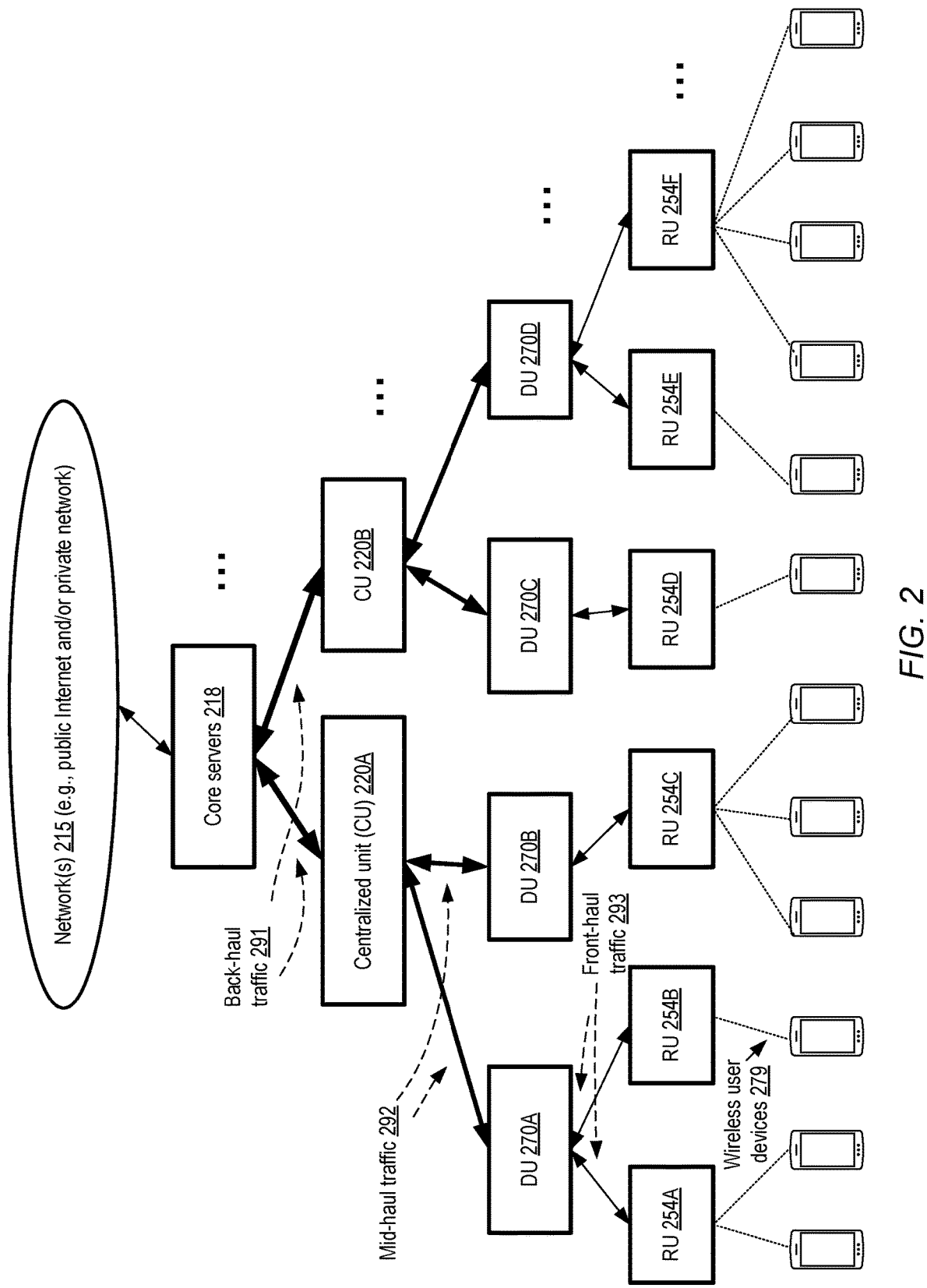
FIG. 2 illustrates an example hierarchy of components of a radio-based application, according to at least some embodiments.

FIG. 2 illustrates an example hierarchy of components of a radio-based application, according to at least some embodiments. The type of hierarchy shown in FIG. 2 may be implemented for production versions of RBAs in some embodiments, while portions of the hierarchy may be emulated or included in multi-network function test sandboxes of the kind introduced above in at least one embodiment. In the depicted scenario, core servers 218, linked to one or more networks 215 used to transfer the Internet Protocol packets comprising the payloads and control signals of radio-based applications over large distances, may implement a set of back-end functions associated with radio-based applications, enabling different sub-networks of the overall system to communicate with one another. Network functions performed at the core servers (referred to as core network functions) may for example include functions to aggregate data traffic from end user devices, authenticate subscribers, apply personalized policies, and/or manage the mobility of devices prior to routing traffic to operator services or the Internet. A given core server 218 may, for example, be implemented using resources (such as a virtualization server) at a provider network data center in one embodiment. The core server may be connected to one or more centralized units (CUs), such as CU 220A and CU 220B. The traffic between the core servers 218 and the CUs 220 may be referred to as back-haul traffic 291 of the RBA. A virtualization server at which a CU is implemented may, for example, be located within a premise at which one or more VCS extension resource groups or outposts are located, at a premise which is located close to such extension premised, or at a primary data center of the provider network.

In the embodiment depicted in FIG. 2, a given CU 220 may be linked to (and manager various tasks associated with) one or more distributed units (DUs) 270 of the RBA. For example, CU 220A may be connected to DU 270A and DU 270B, while CU 220B may be linked to DU 270C and DU 270D. The traffic between CUs and DUs may be referred to as mid-haul traffic 292 in various embodiments. Each of the DUs in turn may be linked with radio units (RUs) 254 associated with one or more cells of a cellular network in the depicted embodiment. For example, DU 270A may be linked to RUs 254A and 254B, DU 270B may be linked to RU 254C, DU 270C may be linked to RU 254D, and DU 270D may be linked to RUs 254E and 254F. The traffic between DUs and RUs may be referred to as front-haul traffic 293. Each of the RUs maybe associated with one or more antennas which can be used to receive and transmit radio frequency signals from a variety of wireless user devices 279. In some embodiments, DUs, CUs and core networks may all be implemented at least in part using provider network resources. In one embodiment, at least some of the functionality of the RUs 254 may also be implemented using provider network resources.

Figure 3:
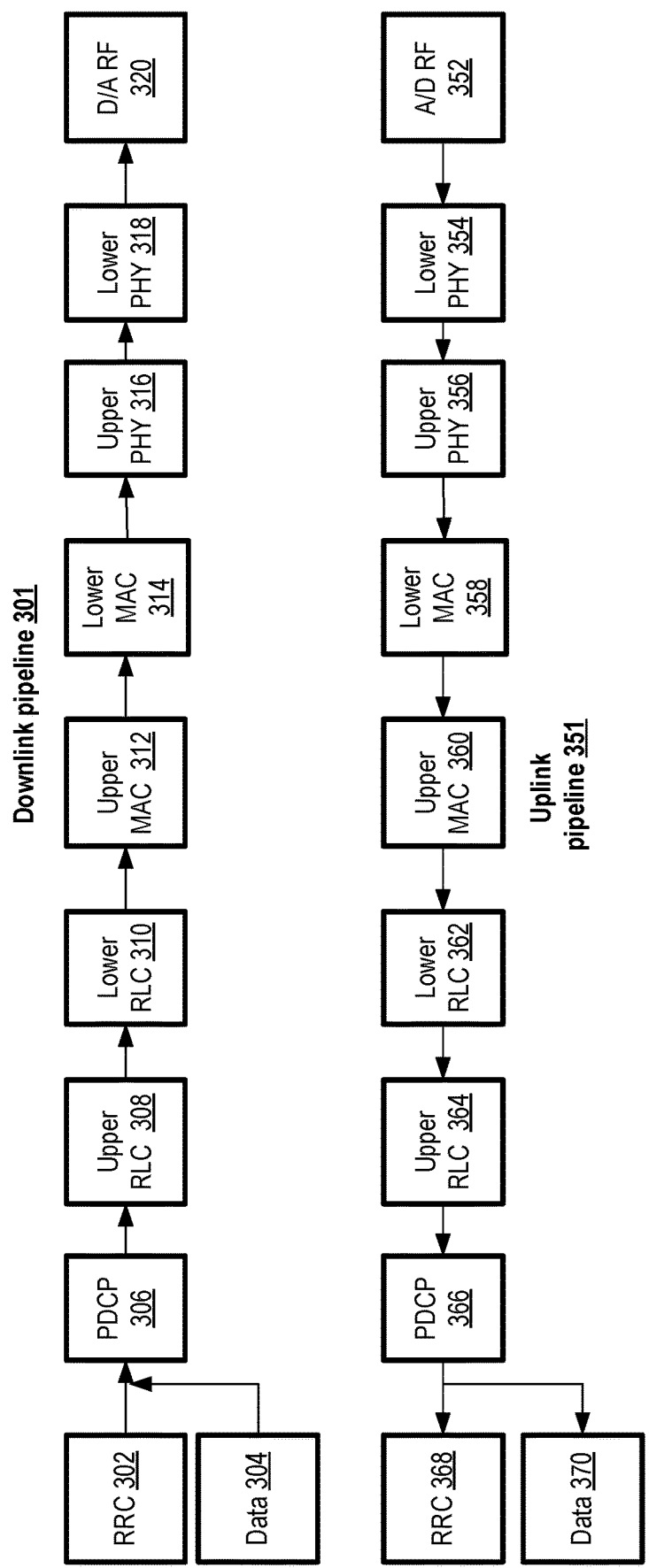
FIG. 3 illustrates example uplink and downlink pipelines of network functions for radio-based applications, according to at least some embodiments.

FIG. 3 illustrates example uplink and downlink pipelines of network functions for radio-based applications, according to at least some embodiments. The downlink communication path starts from the higher levels of a radio-based technology standard, often implemented at back-end servers, downwards to the lower levels which are implemented using front-end components such as radio antennas, network function accelerators and end user devices. The uplink path starts at end user devices and ends at the higher levels. At least some of the network functions shown in the pipelines of FIG. 3 may be implemented as part of DUs or CUs of the kind shown in FIG. 2.

The downlink pipeline 301 starts with RRC (Radio Resource Control) 302 and Data 304 and ends with digital to analog radio frequency (D/A RF) operations 320. In between, the downlink pipeline includes, in sequence, respective sets of network functions for PDCP (Packet Data Convergence Protocol) 306, Upper RLC (Radio Link Control) 308, Lower RLC 310, Upper Medium Access Control (MAC) 312, Lower MAC 314, Upper PHY (physical layer) 316, and Lower PHY 318. The uplink pipeline 351 starts with analog-to-digital radio frequency (A/D RF) operations 352, and ends with RRC 368 and Data 370. In between, network functions are executed in sequence for Lower PHY 354, Upper PHY 356, Lower MAC 358, Upper MAC 360, Lower RLC 362, Upper RLC 364, and PDCP 366.

In various embodiments, at least some network functions of the classes of network functions shown in FIG. 3 may be tested using the automatically configured multi-network-function test sandboxes of the kind introduced above. For example, a software vendor V1's implementation of a PDCP network function may be tested for interoperability with RRC and/or Upper RLC network functions provided by a different vendor V2, and so on.

Figure 4:
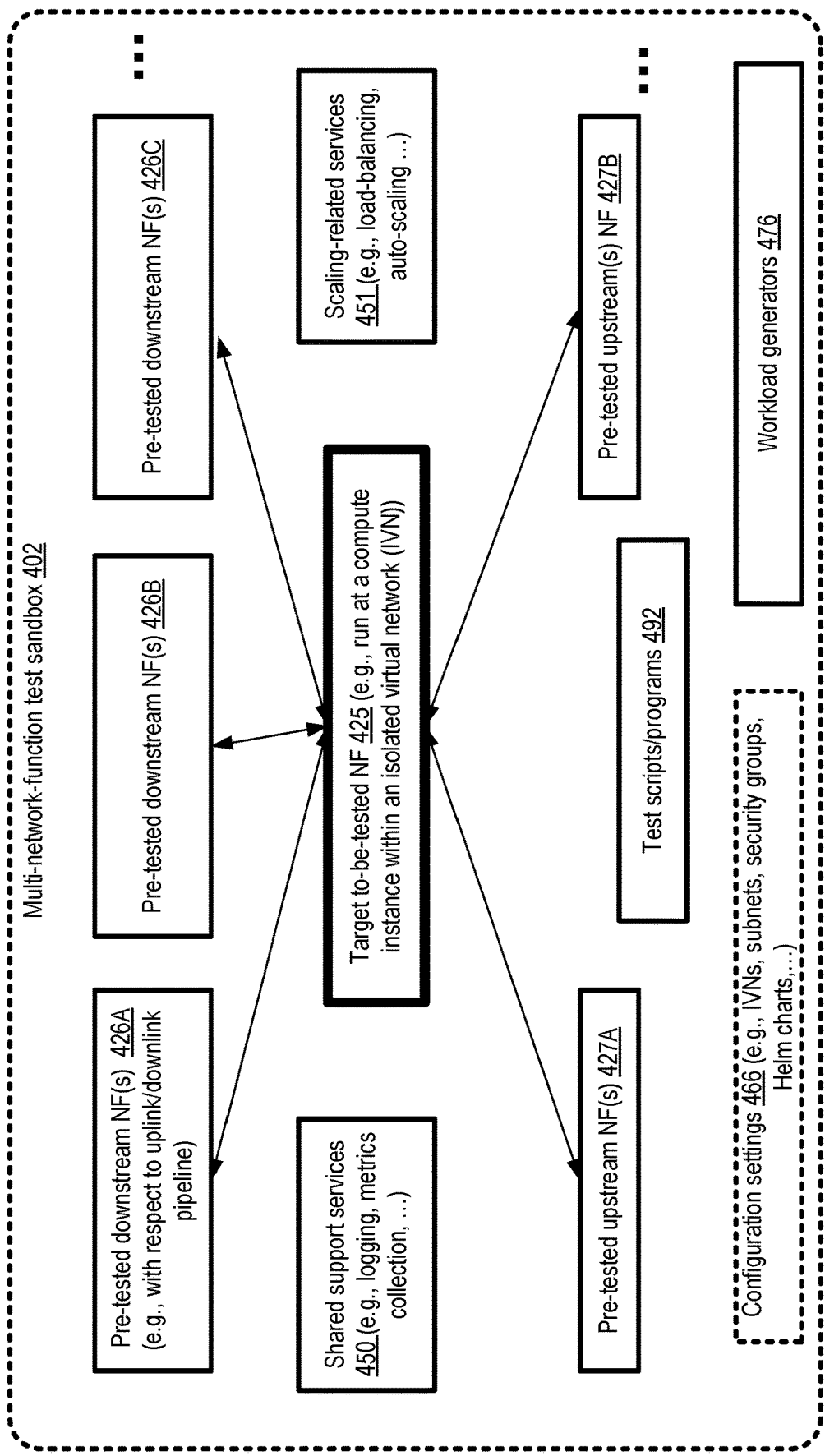
FIG. 4 illustrates example features of a multi-network-function test sandbox which may be configured at a network function management service in response to a testing request, according to at least some embodiments.

FIG. 4 illustrates example features of a multi-network-function test sandbox which may be configured at a network function management service in response to a testing request, according to at least some embodiments. In the example scenario depicted in FIG. 4, a NFMS client has specified a target to-be-tested NF 425, whose functionality, interoperability with other network functions, performance, resilience to errors/failures and/or other properties are to be tested using resources configured by a NFMS similar in features to NFMS 125 of FIG. 1.

In the embodiment depicted in FIG. 4, a testing manager may acquire and configure numerous resources of multi-network-function test sandbox 402 in response to a testing request from the client. For example, the to-be-tested NF 425 may be run using a software container (specified by the vendor that prepared the NF 425) at a compute instance (set up by the testing manager) within an IVN (also set up by the testing manager). Resources for other network functions, which are to interact with and exchange messages with the target NF during the testing, may also be identified, acquired and configured by the testing manager. For example, resources such as compute instances may be obtained for pre-tested downstream NFs 426A, 426B and 426C, as well as pre-tested upstream NFs 427A and 427B. The designations "upstream" and "downstream" refer to the direction in which messages may flow from the other NFs to the target NF, which may in turn depend on whether the uplink or downlink pipeline is being tested. An upstream NF may be one from which the target NF receives a message (either directly, or via other upstream NFs) during a particular phase of a test, while a downstream NF may be one to which the target NF sends a message during a particular phase (either directly, or via other downstream NFs). A given NF can thus be an upstream NF for some parts of a test, and a downstream NF for another part of the test. In some embodiments, interoperability of the target NF with several different NFs at the same layer of the stack may be tested—e.g., interoperability of a target NF (e.g., at an upper RLC layer) from vendor V1 with an upstream NF from vendor V2 at a particular layer (e.g., a PDCP layer) and with another upstream NF from vendor V3 at the particular layer may be tested in response to a single testing request. Separate IVNs may be used for running respective subsets of the NFs tested in some embodiments. In some embodiments, an NF at one layer of the radio-based technology stack (e.g., L1, L2, L3 or the core network) developed by one vendor may be tested together with NFs at other layers that were developed by other vendors.

To set up and interconnect all the network functions being tested, the testing manager may invoke a number of VCS configuration APIs (and/or APIs of other provider network services) in the depicted embodiment, e.g., including APIs for setting up IVNs, subnets, security groups, load balancers, auto-scaling groups and the like. In some embodiments, e.g., in order to simulate the expected production deployment environment, multiple IVNs may be set up, with the target NF being run in one IVN and other NFs running at a different IVN. Security groups represent one example of access controls (also known as security groups, network security groups, application security groups, cloud security groups, or compute engine firewalls rules, in various implementations) which act as a virtual firewall for a compute instance to control inbound and outbound traffic. Security groups may be implemented as policies that can be applied to specific compute instances and/or network function accelerators. When a compute instance is launched in an IVN to run a portion of an RBA that is to be tested, for example, one or more security groups can be assigned to the instance based on the security needs of the RBA and/or based on security recommendations of the VCS. Security groups can act at the instance level, not the subnet level. Therefore, each instance in a subnet can be assigned to a different set of security groups. For each security group, rules that control the inbound traffic to instances can be specified, and a separate set of rules that control the outbound traffic can be specified. Security groups can be stateful, in that return traffic is automatically allowed.

In some embodiments a testing manager may also or instead set up network access control lists (ACLs) with rules similar to security groups in order to add an additional layer of security to a portion of an RBA run at an IVN. Network ACLs operate at the subnet level, support allow rules and deny rules, and automatically apply to all instances in any subnet with which it is associated. Network ACLs may not be stateful, in that return traffic must be explicitly allowed by the rules. The same security group may be used or replicated for multiple compute instances.

The automated selection of configuration settings 466 may represent one of the significant benefits of using the NFMS for testing NFs in various benefits. In some embodiments, the configuration settings may include container deployment metadata similar to Helm charts used for Kubernetes® deployments.

Figure 5:
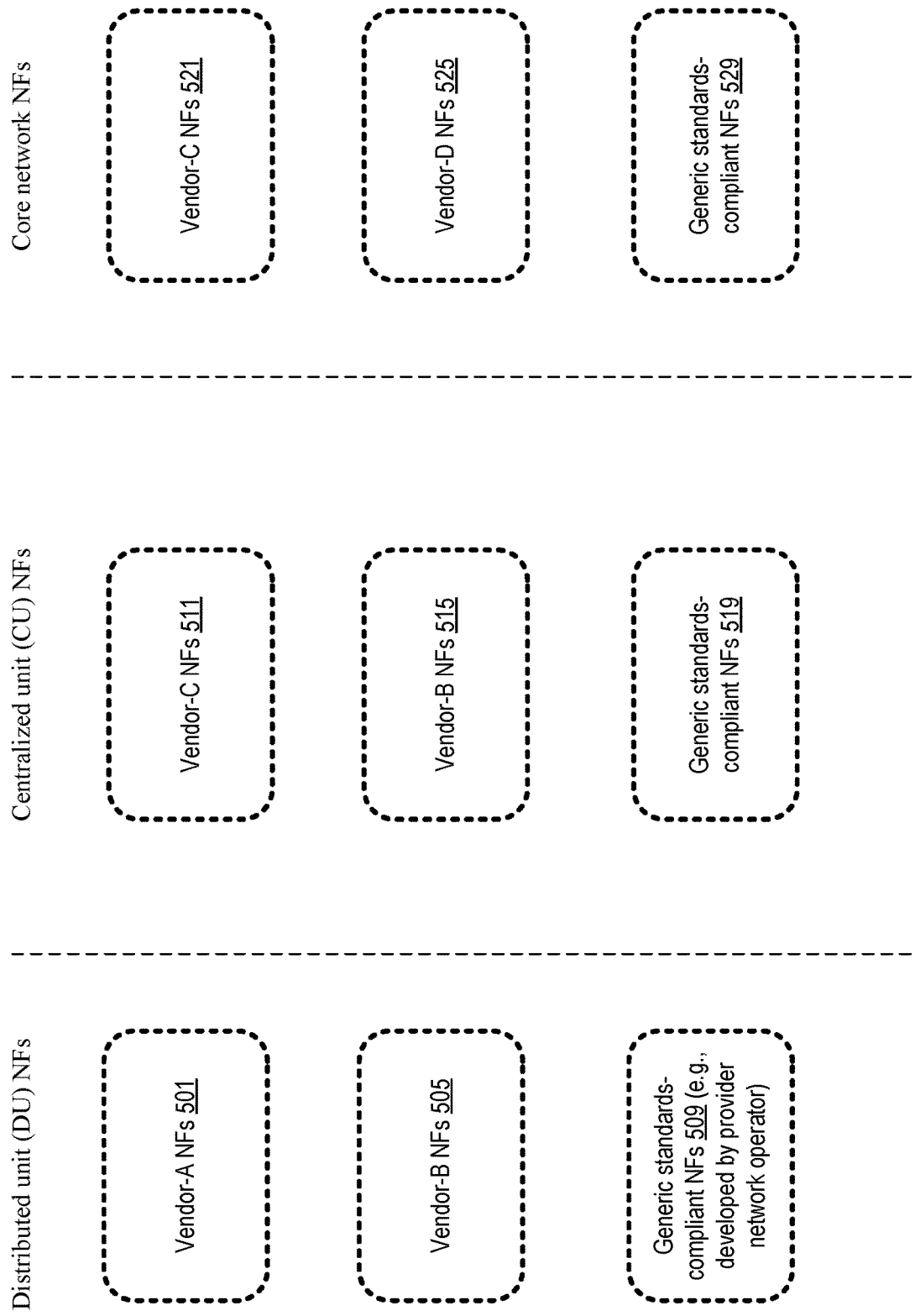
FIG. 5 illustrates an example catalog of pre-tested network functions at various layers of a radio-based application, from which some may be selected for testing a new version of another network function, according to at least some embodiments.

In at least some embodiments, the sandbox may include resources used for workload generators 476 that emulate parts of an RBA other than the pre-tested NFs and the target NF, such as end user devices, media servers or the like. The testing manager may also set up shared support services 450, such as logging, metrics collection and the like which are used during the testing in various embodiments. In one embodiment, the testing manager may configure scaling-related services 451, such as load balancing, auto-scaling and the like for use during the testing. A set of test scripts/programs 492 may be run to exercise the network function during the test in the depicted embodiment. In one embodiment, at least a preliminary or outline version of a test script may be provided by the testing request submitter, and the testing manager may fill in additional details of the script (e.g., network addresses of various network functions) that may be required to run the test in the sandbox. In some embodiments, a multi-network-function sandbox 402 may include other resources with associated artifacts than those shown in FIG. 4. In some embodiments, a testing request from a NFMS client may indicate several different new versions of NFs that are to be tested, and a given sandbox 402 may be set up to test one or more such network functions FIG. 5 illustrates an example catalog of pre-tested network functions at various layers of a radio-based application, from which some may be selected for testing a new version of another network function, according to at least some embodiments. In the example scenario shown in FIG. 5, network functions of at least three layers (the DU layer, the CU layer, and the core network layer) of a radio-based technology stack may be tested by a NFMS similar to NFMS 125 of FIG. 1, and those VNFs whose test results for at least a set of preliminary tests are found to be satisfactory may be included in the catalog. In effect, including a particular NF in the kind of catalog shown in FIG. 5 may serve as a signal to RBA pipeline owners that the NF can be tried out in new pipelines selected/designed by the pipeline owners, in which the NF can be used in combination with one or more other NFs that are also in the catalog.

DU layer NFs may include Vendor-A NFs 501 (i.e., NFs developed by a vendor Vendor-A), Vendor-B NFs 505, and a set of generic standards-compliant NFs 509 which are not associated with any particular vendor external to the provider network. The generic standards-compliant NFs 509 may, for example, have been developed by the teams working for the provider network operator. Note that all the NFs in the catalog may comply with the applicable standards for one or more generations of radio-based technology in various embodiments, not just the generic NFs. The generic NFs may be provided, for example, to allow NF vendors to test new versions of their NFs without utilizing NFs from other vendors.

DU layer NFs may include Vendor-C NFs 511, Vendor-B NFs 515, and generic standards-compliant NFs 519. Core network NFs may include Vendor-C NFs 521, Vendor-D NFs 525 and generic standards-compliant NFs 529 in the depicted embodiment. A given vendor may use the NFMS to test several different NFs, which the vendor has developed for different layers of the radio-based technology stack, in some embodiments. For example, Vendor-B has developed and tested NFs at the DU layer and the CU layer, while vendor C has developed and tested NFs at the CU layer and the core network. In at least some embodiments, the NFMS may maintain mappings between identifiers of tested NFs and executable code (e.g., within software containers) of the NFs, so that pipelines comprising various combinations of tested NFs and yet-to-be-tested NFs can be set up quickly for additional testing.

Figure 6:
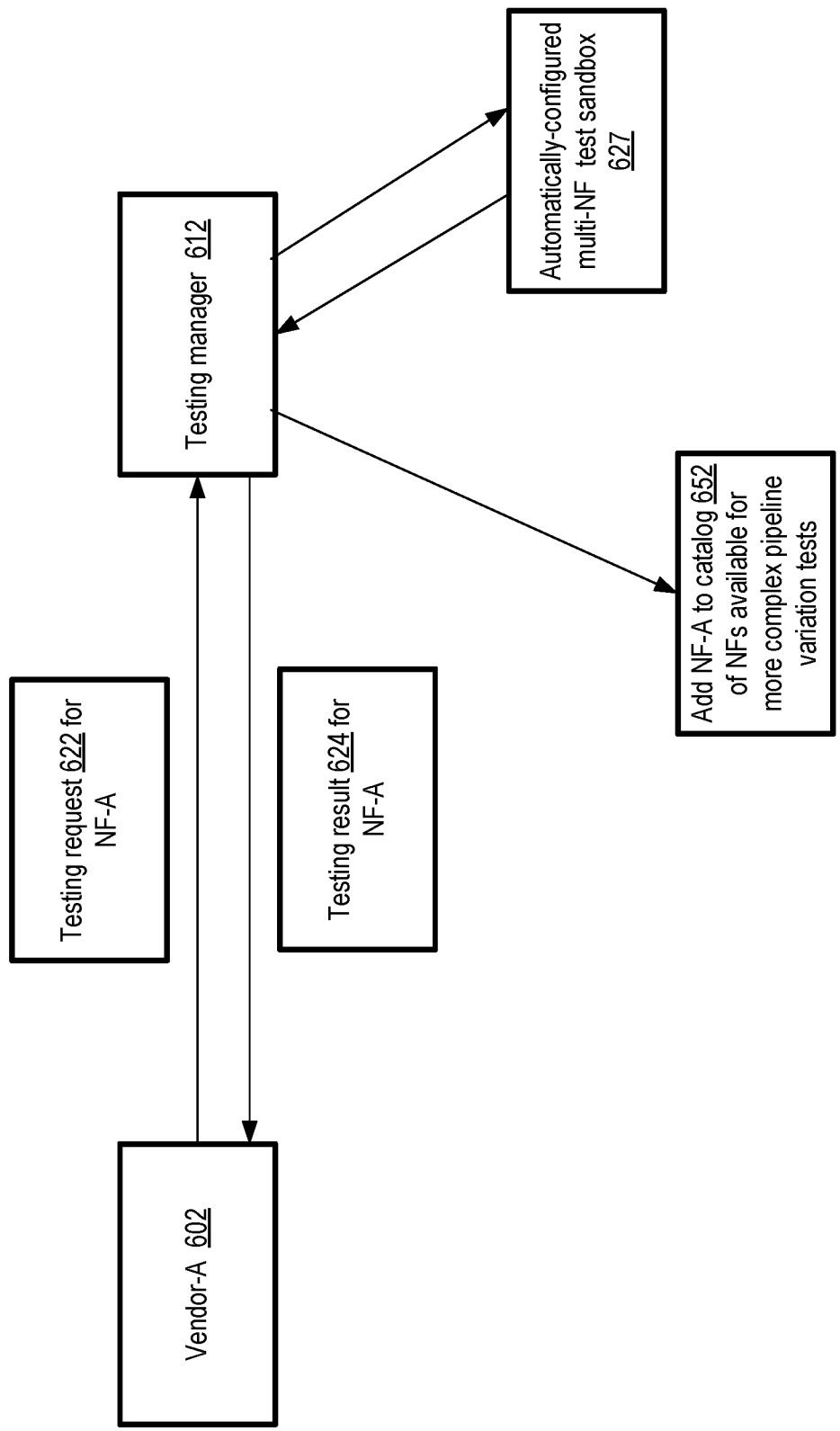
FIG. 6 illustrates an example of processing of a testing request which may be submitted by a network function vendor to a cloud-based network function management service, according to at least some embodiments.

FIG. 6 illustrates an example of processing of a testing request which may be submitted by a network function vendor to a cloud-based network function management service, according to at least some embodiments. In the scenario depicted in FIG. 6, a vendor (Vendor-A) 602 of a network function NF-A may submit a testing request 622 for NF-A to a testing manager 612 of a NFMS. The testing request may indicate a small set of other network functions (e.g., from other vendors, or from a set of generic NFs made available by the provider network), in combination with which NF-A is to be tested, but may not necessarily specify a complete end-to-end pipeline of an RBA within which NF-A is to be tested.

In response to the testing request 622, the testing manager 612 may establish an automatically-configured multi-NF test sandbox 627, with features similar to those shown in FIG. 4 in the depicted embodiment. The testing manager may cause the desired tests (which may be indicated via a skeleton or to-be-filled version of a test script included in the testing request, which the testing manager fills out) to be run. A testing result 624 for NF-A may be provided to the client after the test is conducted. If the results of the test are satisfactory, NF-A may be added to a catalog 652 of NFs available for more complex tests, such as pipeline variation tests using different combinations of NFs in the depicted embodiment. The decision as to whether the test results are satisfactory may be made, for example, by the NFMS and/or by Vendor-A in the depicted embodiment. In at least some embodiments the NFMS may publish the criteria used for determining whether a given NF is eligible for inclusion in a catalog of pre-tested NFs, and such criteria may be applied to the testing result.

Figure 7:
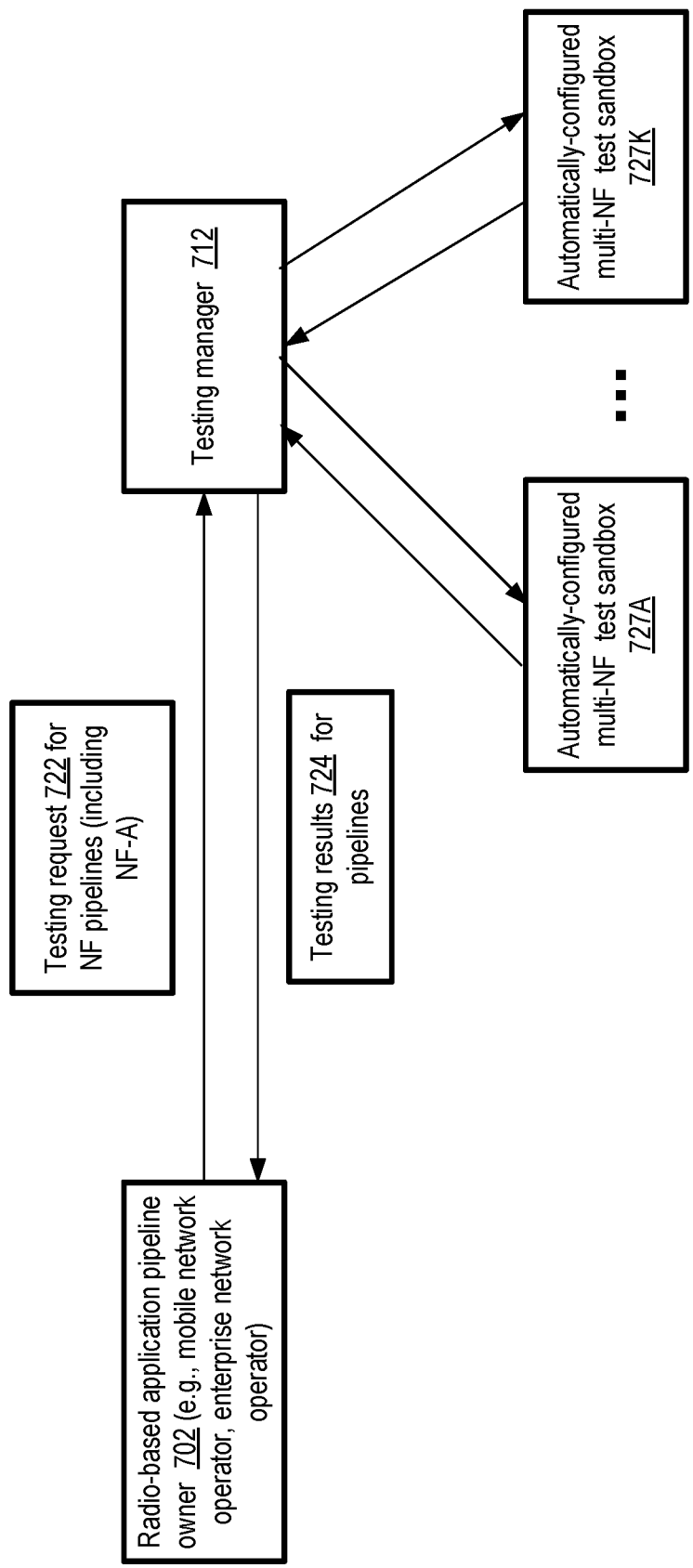
FIG. 7 illustrates an example of processing of a testing request which may be submitted by a radio-based pipeline owner to a cloud-based network function management service, according to at least some embodiments.

FIG. 7 illustrates an example of processing of a testing request which may be submitted by a radio-based pipeline owner to a cloud-based network function management service, according to at least some embodiments. In the depicted example scenario, a testing request 722 for one or more NF pipelines that include a specified network function NF-A may be submitted by a radio-based application pipeline owner 702 (e.g., a mobile network operator or an enterprise network operator). An enterprise network operator may for example use a private 5G network for connectivity between a collection of IoT devices and various computers within a large factory in some embodiments. The testing request 722 may specify multiple contexts within which NF-A should be tested, e.g., indicating different combinations of other network functions for each context in some embodiments.

In some cases, it may be possible for the testing manager 712 responsible for fulfilling the testing request 722 to execute different testing scenarios corresponding to the testing request 722 in parallel. The testing manager 712 may, for example set up several different sandboxes, and execute different runs of the tests at the different sandboxes at least partly concurrently with one another. Automatically-configured multi-NF test sandbox 727A may be set up, for example, for testing NF-A in combination with other NFs NF-B and NF-C, while automatically-configured multi-NF test sandbox 727K may be set up for testing NF-A in combination with other NFs NF-P and NF-Q. In some embodiments, different sandboxes may be used to run respective levels of workload for NF-A—e.g., using the set of resources configured in sandbox 727A, up to K messages/second may be directed from a different NF layer NF—B-layer to NF-A, while using the set of resources configured in sandbox 727K, up to L messages/second from the NF—B layer to NF-A. The testing results 724 for the different pipelines may be provided via programmatic interfaces to the radio-based application pipeline owner. In some embodiments, a catalog of tested RBA pipelines may also be made accessible by a NFMS, enabling other RBA pipeline owners to utilize a successfully-tested combination of network functions for their own applications.

Figure 8:
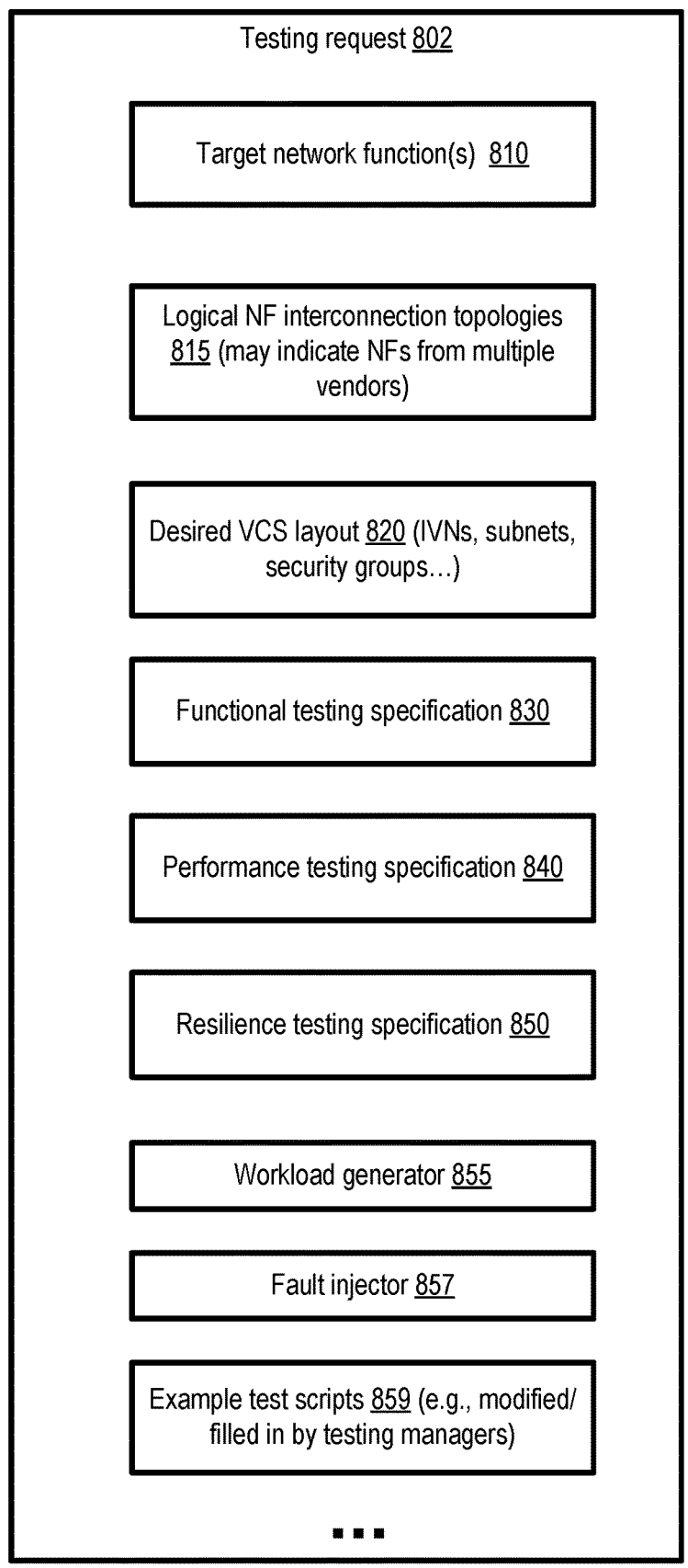
FIG. 8 illustrates example elements of a testing request which may be submitted to a cloud-based network function management service, according to at least some embodiments.

FIG. 8 illustrates example elements of a testing request which may be submitted to a cloud-based network function management service, according to at least some embodiments. A shown, a testing request 802 submitted via programmatic interfaces to a NFMS or a NF testing service may comprise an indication of one or more target network function(s) 810 which are to be tested using cloud provider network resources. In one implementation, for example, a pointer to, or an identifier of, machine images of one or more software containers that comprise executable code of the network functions may be included in a testing request 802. In some embodiments, an NF vendor may provide source code in addition to or instead of executable code of their NFs. In some testing requests from radio-based application pipeline owners, identifiers of catalog entries for the NFs may be included, and the testing manager may identify executable versions of the NFs for each of the catalog entries using catalog-entry-to-NF-executable mappings maintained by the NFMS.

One or more logical NF interconnection topologies 815 may be included in a testing request in some embodiments. The interconnection topologies may indicate which NFs are to be linked to which other NFs at various layers of an RBA pipeline; using such interconnection topologies, NFs from several different vendors or sources may be combined and tested together. In at least one embodiment, an interconnection topology may indicate a mapping between NFs and servers—e.g., which NFs of the topology can be run on the same server, and which NFs should be run on distinct servers. In some embodiments, an interconnection topology may be specified in a testing request using TOSCA (Topology and Orchestration Specification for Cloud Applications) or a similar specification/standard. In one such embodiment, the testing request may indicate a complex topology using TOSCA or a similar specification, and a testing manager may generate a simplified version of the complex topology. The simplified version may then be used for at least a portion of the testing conducted at the NFMS. The testing manager may obtain approval (using a programmatic interface of the NFMS) from the submitter of the testing request before using such a simplified version instead of the complex version in some implementations.

In some embodiments, a desired VCS layout 820 to be utilized for at least some of the tests may be indicated in the testing request 802. The desired VCS layout may indicate, for example, the mappings between NFs, IVNs, subnets, and compute instances, the security groups to be set up for different NFs and compute instances, requirements for load balancers (if any), auto-scaling groups (if any) and the like. IVNs, subnets, and compute instances are examples of VCS logical objects or entities. The desired VCS layout may thus indicate the manner in which various VCS logical objects are to be used together for testing the NFs; the testing manager may be responsible for performing the specific configuration operations needed to establish and configure the entities.

A testing request 802 may include one or more types of testing specifications in some embodiments, indicating the specific types of operations to be performed using the NFs being tested. For example, some testing requests may include functional testing specifications 830, indicating the sets of APIs that are to be used at or by a target NF and one or more other NFs. The functional testing specification may for example be intended to determine whether a target NF satisfies the interface specifications of an RBA technology standard, and can therefore work with other NFs which also satisfy the interface specifications and are expected to communicate with the target NF to implement a portion of an RBA pipeline.

In some embodiments, a testing request may include a performance testing specification 840, indicating for example arrange of workload levels that are to be applied to the target NF. The workload may be applied, for example, by using a workload generator 855 indicated in the testing request, such as a third-party or open source workload generator for radio-based applications. The testing manager may vary the workload experienced by the to-be-tested NF(s) in accordance with the performance specification in various embodiments as part of the testing performed using one or more sandboxes of the kind discussed above.

A testing request may include a resilience testing specification 850 in various embodiments, specifying one or more types of events/failures/errors to which the response of the to-be-tested network function(s) is to be determined. In some embodiments, the submitter of the testing request may specify a fault injector 857 (e.g., a $3^{rd}$ party tool) that can be used to introduce the faults into the RBA at specific points/layers indicated in the resilience testing specification. The faults may be injected, for example, by using an incorrect network address, by overwriting contents of a message, and so forth. In embodiments in which the testing request does not indicate a fault injector or a workload generator, the VFNMS may choose a fault injector or a workload generator.

In at least one embodiment, a testing request may include one or more example test scripts 859. The example test scripts, also referred to as script skeletons or outlines, may provide an indication of the sequence of steps which should be taken in the requested test. In at least some embodiments, the test scripts may be incomplete in that, for example, the specific network addresses to which messages are to be sent as part of the test may not be indicated in them. Such addresses, which may be selected by the testing manager as part of the configuration operations of setting up the sandbox (es) used, may be filed in by the testing manager in some embodiments before conducting the tests. Testing requests may comprise other combinations of elements in some embodiments than the combination shown in FIG. 8. Note that a given testing request may not necessarily specify more than one type of testing specification in various embodiments—e.g., some testing requests may include only functional testing specifications, others may include only performance testing specifications, yet others may include only resilience testing specifications, and so on.

Figure 9:
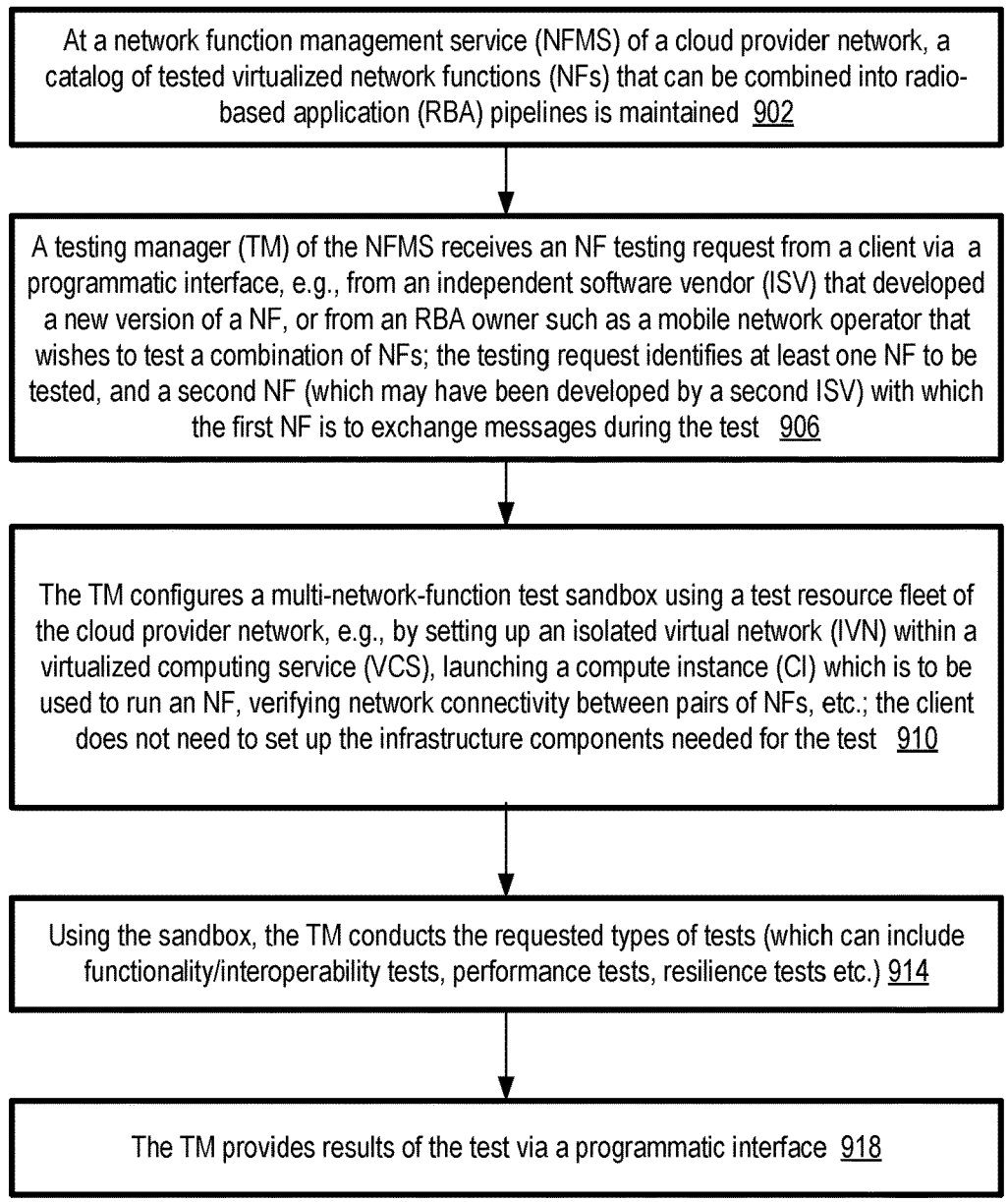
FIG. 9 is a flow diagram illustrating aspects of operations that may be performed to test network functions at a cloud-based network function management service, according to at least some embodiments.

FIG. 9 is a flow diagram illustrating aspects of operations that may be performed to test network functions at a cloud-based network function management service, according to at least some embodiments. As shown in element 902, a catalog of at least functionally-tested network functions from various vendors may be maintained at a network function management service (NFMS) similar to NFMS 125 of FIG. 1 in the depicted embodiment. The NFs in the catalog may be combined into various pipelines of radio-based applications if desired, which may themselves be tested at the NFMS upon request. In some embodiments, testing of network functions may be performed at a specialized network function testing service incorporated within a larger NFMS of a cloud provider network, or at a testing service external to the NFMS at a cloud provider network.

A testing manager (TM) of the NFMS may receive an NF testing request from a client of the NFMS via a programmatic interface (element 906). The testing request may be submitted, for example, by an independent software vendor (ISV) that developed a new version of the NF, or from an RBA pipeline owner that wishes to test a combination of NFs. The testing request may identify at least one NF to be tested and a second NF (which may have been developed by a different vendor) with which the first NF is to exchange messages during the test in the depicted embodiment. Various other elements such as those shown in FIG. 8 may be included in the testing request in different embodiments.

The TM may configure a multi-network-function test sandbox using a test resource fleet of the cloud provider network in the depicted embodiment (element 910). Various configuration operations may be performed in different embodiments to set up the sandbox, such as setting up one or more IVNs within a VCS of the provider network, launching a compute instance which is to be used to run an NF, verifying network connectivity between pairs of NFs, and the like. The client may not need to set up infrastructure objects such as the IVNs or compute instances in various embodiments; the infrastructure tasks may be handled by the testing manager instead in such embodiments.

Using the sandbox, the TM may conduct the requested types of tests, which may for example include function/interoperability tests, performance tests, resilience tests and so on (element 914). Results of the testing may be provided via one or more programmatic interfaces of the NFMS in some embodiments (element 918). In at least one embodiment, an NF whose results are determined to be satisfactory by the testing manager and/or by the client may be included in a catalog of NFs from which various combinations of NFs can be combined to implement RBA pipelines.

It is noted that in various embodiments, some of the operations shown in the flow chart of FIG. 9 may be implemented in a different order than that shown in the figure, or may be performed in parallel rather than sequentially. Additionally, some of the operations shown in FIG. 9 may not be required in one or more implementations.

Figure 10:
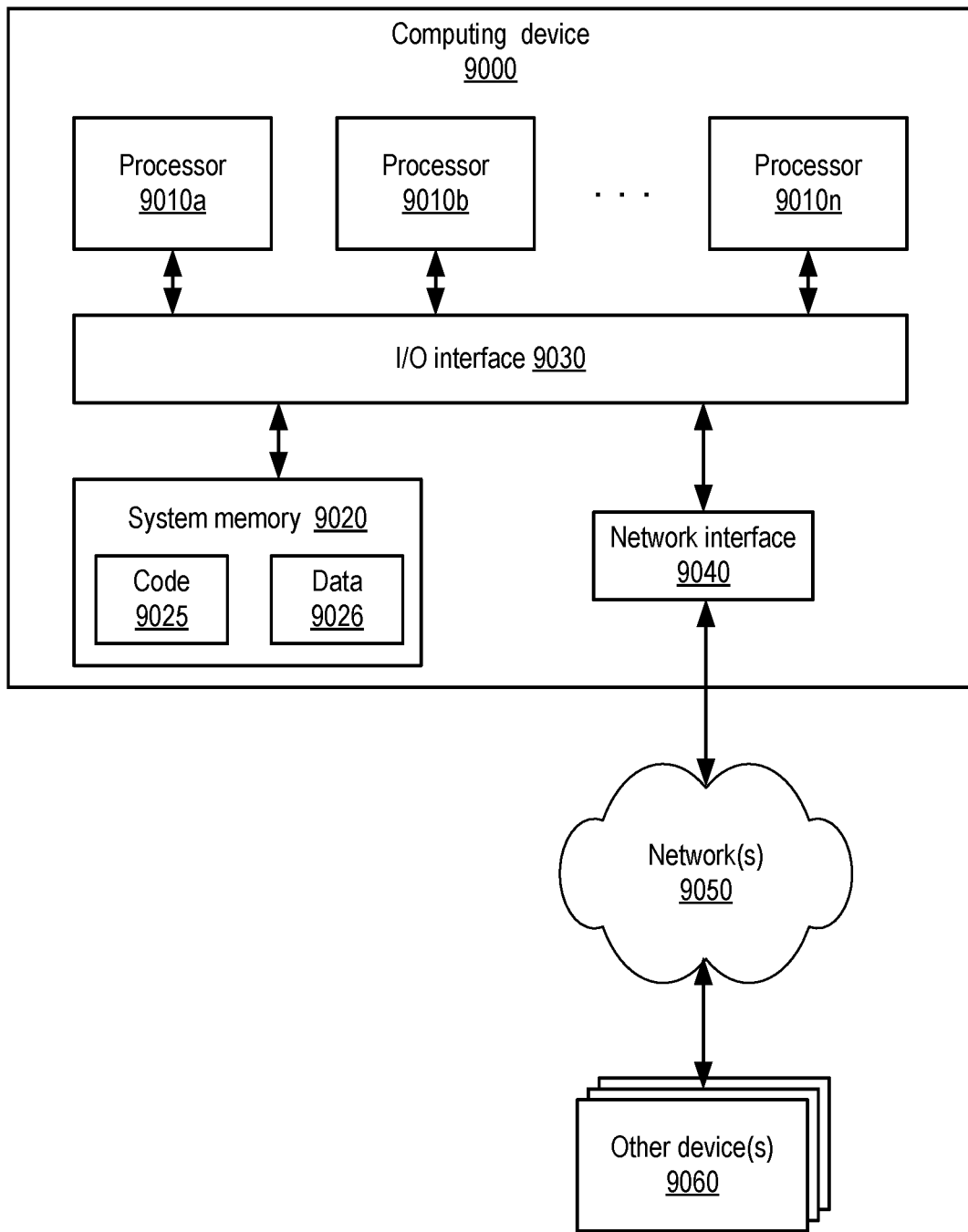
FIG. 10 is a block diagram illustrating an example computing device that may be used in at least some embodiments.

In at least some embodiments, a server that implements the types of techniques described herein (e.g., various functions of a provider network service such as an NFMS, VCS and the like) may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a testing manager of a network function management service of a cloud provider network; and
   a test resource fleet comprising a plurality of servers;
   wherein the testing manager is configured to:
      receive a testing request, via a programmatic interface, indicating at least a first network function of a radio-based application, wherein the first network function is developed by a first software vendor; and
      in response to the received testing request:
         establish a multi-network-function test sandbox for the first network function, wherein said establish the multi-network-function test sandbox comprises:
            establish a first isolated virtual network of a virtualized computing service of the cloud provider network;
            launching, at a first server of the test resource fleet, a first compute instance within the first isolated virtual network;
            cause the first network function to be executed using the first compute instance; and
            verify network connectivity between the first network function and a second network function, wherein the second network function is developed by a second software vendor; and
         run a test which includes an exchange of messages between the first network function and the second network function; and
         provide, via a programmatic interface, a result of the test.

2. The system as recited in claim 1, wherein the testing manager is further configured to:
   determine a number of servers to be included in the multi-network-function test sandbox based at least in part on a network function interconnection topology included in the testing request; and
   cause the second network function to be executed at a second server of the test resource fleet in accordance with the network function interconnection topology.

3. The system as recited in claim 1, wherein the second network function is (a) a network function of a physical or L1 layer of a radio-based technology stack and (b) executed at least in part at a hardware network function accelerator, and wherein the first network function is a network function of another layer of the radio-based technology stack.

4. The system as recited in claim 1, wherein during the test, the second network function is run within a second isolated virtual network.

5. The system as recited in claim 1, wherein to run the test, the testing manager is further configured to:
   determine a response of the first network function to an introduced error or failure in accordance with a resilience testing specification indicated in the testing request.

6. A computer-implemented method, comprising:
   performing, by a testing manager of a network function management service of a provider network:
      receiving a testing request, via a programmatic interface, indicating a first network function of a radio-based application, wherein the first network function is developed by a first vendor; and
      in response to the received testing request:
         establishing a multi-network-function test sandbox for the first network function, wherein establishing the multi-network-function test sandbox comprises:
            causing the first network function to be run at a first server assigned by the testing manager; and
            verifying network connectivity between the first network function and a second network function, wherein the second network function is not developed by the first vendor; and
         executing a test which includes transmission of messages from the first network function to the second network function; and
         providing, via a programmatic interface, a result of the test.

7. The computer-implemented method as recited in claim 6, wherein the testing request is submitted by the first vendor.

8. The computer-implemented method as recited in claim 6, further comprising:
   providing, via a programmatic interface prior to receiving the testing request to an entity other than the first vendor, an indication that the first network function is available for testing of radio-based application pipelines, wherein the testing request is submitted by the entity other than the first vendor.

9. The computer-implemented method as recited in claim 6, wherein establishing the multi-network-function test sandbox comprises:
establishing a load balancer for network traffic transmitted between a pair of layers of a multi-layer network function pipeline, wherein executing the test comprises causing network traffic to be transmitted between the pair of layers, and wherein the first network function is executed in the test at a particular layer of the multi-layer network function pipeline.

10. The computer-implemented method as recited in claim 6, wherein establishing the multi-network-function test sandbox comprises:
establishing an auto-scaling group for resources at a particular layer of a multi-layer network function pipeline, wherein the first network function is executed in the test at a particular layer of the multi-layer network function pipeline.

11. The computer-implemented method as recited in claim 6, wherein executing the test comprises:
causing a workload level of the first network function to be varied in accordance with a performance testing specification indicated in the testing request.

12. The computer-implemented method as recited in claim 6, wherein executing the test comprises:
determining a response of the first network function to an introduced error or failure in accordance with a resilience testing specification indicated in the testing request.

13. The computer-implemented method as recited in claim 6, wherein executing the test comprises:
causing at least one network function executed during the test to be run at a network function accelerator of the first server.

14. The computer-implemented method as recited in claim 6, wherein the testing request includes an interconnection topology to be used for the test, the computer-implemented method further comprising:
utilizing, in accordance with the interconnection topology, a second server to run the second network function.

15. The computer-implemented method as recited in claim 6, wherein the first network function implements a portion of one of: (a) a distributed unit (DU) of a radio access network (RAN) node, (b) a centralized unit (CU) of a RAN node, or (c) a core network of a radio-based application.

16. A non-transitory computer-accessible storage medium storing program instructions that when executed on a processor implement a testing manager of a provider network, wherein the testing manager is configured to, responsive to receiving a testing request:
establish a multi-network-function test sandbox for a first network function, wherein the first network function is developed by a first vendor, wherein said establish of the multi-network-function test sandbox comprises:
cause the first network function to be run at a server of the provider network; and
verify network connectivity between the first network function and a second network function, wherein the second network function is not developed by the first vendor;
initiate a test which includes transmission of messages from the first network function to the second network function; and
provide, via a programmatic interface, a result of the test.

17. The non-transitory computer-accessible storage medium as recited in claim 16, wherein the testing manager is further configured to:
cause messages produced by a workload generation tool to be received at a network function of the first and second network functions, wherein the workload generation tool is indicated in a programmatic request for the test.

18. The non-transitory computer-accessible storage medium as recited in claim 16, wherein the first network function implements a portion of one of: (a) a distributed unit (DU) of a radio access network (RAN) node, (b) a centralized unit (CU) of a RAN node, or (c) a core network of a radio-based application.

19. The non-transitory computer-accessible storage medium as recited in claim 16, wherein the testing manager is further configured to:
cause, during the test, a workload level of the first network function to be varied in accordance with a performance testing specification.

20. The non-transitory computer-accessible storage medium as recited in claim 16, wherein the testing manager is further configured to:
determine a response of the first network function to an introduced error or failure in accordance with a resilience testing specification.

* * * * *